United States Patent
Hara et al.

(10) Patent No.: US 8,412,210 B2
(45) Date of Patent: Apr. 2, 2013

(54) METHOD AND DEVICE FOR TRANSFERRING DATA, MOBILE TERMINAL AND BASE STATION

(75) Inventors: Yoshitaka Hara, Rennes Cedex (FR); David Mottier, Rennes Cedex (FR); Loic Brunel, Rennes Cedex (FR); Noriyuki Fukui, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 597 days.

(21) Appl. No.: 11/855,433

(22) Filed: Sep. 14, 2007

(65) Prior Publication Data

US 2008/0076464 A1    Mar. 27, 2008

(30) Foreign Application Priority Data

Sep. 22, 2006    (EP) .................................... 06019911

(51) Int. Cl.
*H04W 72/00*    (2009.01)

(52) U.S. Cl. .................... 455/450; 455/451; 455/452.1; 455/509

(58) Field of Classification Search .................. 455/522, 455/67.11, 68–70, 115.3, 126, 127.1, 127.2, 455/135, 226.3, 277.2, 296, 450–453, 456.2, 455/464, 509, 510, 422.1; 370/318, 395.41, 370/332
See application file for complete search history.

(56) References Cited

U.S. PATENT DOCUMENTS

| | | | |
|---|---|---|---|
| 6,285,663 B1 | 9/2001 | Esmailzadeh | |
| 6,456,849 B1* | 9/2002 | Purnadi et al. | 455/453 |
| 6,950,659 B2* | 9/2005 | Seo | 455/450 |
| 7,310,526 B2* | 12/2007 | Sang et al. | 455/436 |
| 7,315,744 B2* | 1/2008 | Achour | 455/453 |
| 7,634,278 B2* | 12/2009 | Takayanagi et al. | 455/452.2 |
| 7,920,866 B2* | 4/2011 | Bosch et al. | 455/436 |
| 2001/0036200 A1* | 11/2001 | Nelson et al. | 370/503 |
| 2002/0115443 A1* | 8/2002 | Freiberg et al. | 455/450 |
| 2002/0137514 A1* | 9/2002 | Mitsugi et al. | 455/436 |
| 2003/0027587 A1 | 2/2003 | Proctor, Jr. | |
| 2003/0067897 A1* | 4/2003 | Black | 370/335 |
| 2003/0125031 A1* | 7/2003 | Sung Lim et al. | 455/447 |
| 2004/0077370 A1 | 4/2004 | Dick et al. | |
| 2004/0132460 A1* | 7/2004 | Lee | 455/453 |

(Continued)

FOREIGN PATENT DOCUMENTS

EP    0 991 204 A1    4/2000

*Primary Examiner* — Dominic E Rego
(74) *Attorney, Agent, or Firm* — Oblon, Spivak, McClelland, Maier & Neustadt, L.L.P.

(57) ABSTRACT

The present invention concerns a method, a device, a mobile terminal and a base station for transferring data from a mobile terminal to a base station after a wireless resource enabling the transfer of the data from the mobile terminal to the base station has been allocated. The method comprises the steps, executed by the mobile terminal, of transferring, information indicating whether or not an allocated wireless resource is needed for the transfer of the data from the mobile terminal to the base station, the information indicating that no allocated wireless resource is needed for the transfer of the data from the mobile terminal to the base station being transferred by setting the power of pilot symbols to a null value, receiving, from the base station, allocation information indicating that the wireless resource is allocated to the mobile terminal when the information indicates that the allocated wireless resource is needed, and transferring the data to the base station in the wireless resource indicated as allocated to the mobile terminal.

12 Claims, 4 Drawing Sheets

U.S. PATENT DOCUMENTS

| | | | |
|---|---|---|---|
| 2004/0166887 A1* | 8/2004 | Laroia et al. | 455/522 |
| 2004/0214591 A1* | 10/2004 | Lott et al. | 455/522 |
| 2005/0176440 A1* | 8/2005 | Sang et al. | 455/453 |
| 2005/0286408 A1* | 12/2005 | Jin et al. | 370/208 |
| 2006/0013338 A1* | 1/2006 | Gore et al. | 375/324 |
| 2006/0199577 A1* | 9/2006 | Ramakrishna et al. | 455/422.1 |
| 2006/0262841 A1* | 11/2006 | Vaisanen et al. | 375/227 |
| 2007/0087749 A1* | 4/2007 | Ionescu et al. | 455/436 |
| 2007/0207828 A1* | 9/2007 | Cheng et al. | 455/522 |
| 2009/0252124 A1* | 10/2009 | Yeo et al. | 370/336 |

* cited by examiner

METHOD AND DEVICE FOR TRANSFERRING DATA, MOBILE TERMINAL AND BASE STATION

BACKGROUND

1. Field of the Invention

The present invention relates generally to telecommunication systems and in particular, to a method and a device for transferring signals representative of a pilot symbol pattern to a telecommunication device.

2. Description of the Related Art

In some telecommunication networks, the access by the mobile terminals to the resources of the telecommunication medium is decided by the base station.

In uplink scheduling scheme, when a mobile terminal needs to transfer data through the base station, the mobile terminal sends a message to the base station requesting a pilot symbol pattern to be allocated. The base station allocates to each mobile terminal a pilot symbol pattern, for a pilot allocation time duration which is as example of 20 milliseconds. During the pilot allocation time duration, each second telecommunication device 20 transfers periodically, as example every millisecond and at the same time to the base station, signals representative of the pilot symbol pattern it has been allocated.

The base station determines the channel conditions which exist between itself and each mobile terminal using the signals received which are representative of the pilot symbol patterns. The base station selects the mobile terminal which has to transfer data to the base station according to the determined channel conditions.

In such technique, when a mobile terminal needs to transfer data to the base station, it must transfer periodically as example every millisecond, during all the pilot allocation time duration, signals representative of the pilot symbol pattern to the base station.

If the channel conditions which exist between that mobile terminal and the base station are better than the ones which exist between the other mobile terminals and the base station, the base station selects that mobile terminal as the one which has to transfer data to the base station. However, the selected terminal may have no more data to transfer to the base station. In such case, the resources of the telecommunication system are used inefficiently.

Furthermore, if the mobile terminal has no more data to transfer, it must use the electric power resources in order to transfer periodically signals representative of the pilot symbol pattern to the base station. Such case is not satisfactory also in term of electric power consumption.

One solution could be to reduce the pilot allocation time duration in order to avoid that problem but such solution increases a lot the messages exchanged between the mobile terminals and the base station and then, the resources of the telecommunication system are still used inefficiently.

It has to be noted also that, in the prior art, the pilot symbol patterns are transferred for the only purpose of the channel conditions determination.

SUMMARY OF THE INVENTION

The aim of the invention is therefore to propose methods and devices which allow an improvement of the above mentioned technique and which enable to use signals representative of a pilot symbol pattern for another purpose than channel conditions determination, in order to improve the use of the resources of the telecommunication system and to better use of the electric power resources.

To that end, the present invention concerns a method for transferring data from a mobile terminal to a base station after a wireless resource enabling the transfer of the data from the mobile terminal to the base station has been allocated, the mobile terminal performing the method comprising:

transferring, information indicating whether or not an allocated wireless resource is needed for the transfer of the data from the mobile terminal to the base station, the information indicating that no allocated wireless resource is needed for the transfer of the data from the mobile terminal to the base station being transferred by setting the power of pilot symbols to a null value.

receiving, from the base station, allocation information indicating that the wireless resource is allocated to the mobile terminal when the information indicates that the allocated wireless resource is needed, and transferring the data to the base station in the wireless resource indicated as allocated to the mobile terminal.

According to a particular feature, the information indicating whether or not the allocated wireless resource is needed for the transfer of data from the mobile terminal to the base station is needed is transferred periodically.

According to a particular feature, a pilot symbol allocated to the mobile terminal is orthogonal to another pilot symbol allocated to another mobile terminal.

According to a particular feature, the data is transferred as packets.

The present invention concerns a method of transferring data from a mobile terminal to a base station after a wireless resource enabling the transfer of the data from the mobile terminal to the base station has been allocated, the base station performing the method comprising;

receiving, from the mobile terminal, information indicating whether or not an allocated wireless resource is needed for the transfer of the data from the mobile terminal to the base station, the information indicating that no allocated wireless resource is needed for the transfer of the data from the mobile terminal to the base station being transferred by setting the power of piloy symbols to a null value transferring, to the mobile terminal, allocation information indicating that the wireless resource is allocated to the mobile terminal when the information indicates that the allocated wireless resource is needed, and receiving, from the mobile terminal, the data in the wireless resource indicated as allocated to the mobile terminal.

According to a particular feature, the information indicating whether or not the allocated wireless resource is needed for the transfer of data from the mobile terminal to the base station is received periodically.

According to a particular feature, the base station allocates othogonal pilot symbols to at least two mobile terminals.

According to a particular feature, the data is received as packets.

The present invention concerns also a device for transferring data from a mobile terminal to a base station after a wireless resource enabling the transfer of the data from the mobile terminal to the base station has been allocated, wherein the device for transferring of the data is included in the mobile terminal and comprises:

means for transferring, to the base station, information indicating whether or not an allocated wireless resource is needed for the transfer of the data from the mobile terminal to the base station, the information indicating that no allocated wireless resource is needed for the transfer of the data from the mobile terminal to the base station being transferred by setting the power of pilot symbols to a null value;

means for receiving, from the base station, allocation information indicating that the wireless resource is allocated to the mobile terminal when the information indicates that the allocated wireless resource is needed; and means for transferring data to the base station in the wireless resource indicated as allocated to the mobile terminal.

The present invention concerns a device for transferring data from a mobile terminal to a base station after a wireless resource enabling the transfer of the data from the mobile terminal to the base station has been allocated, wherein the device for transferring of the data is included in the base station and comprises;

means for receiving, from the mobile terminal, information indicating whether or not an allocated wireless resource is needed for the transfer of the data from the mobile terminal to the base station, the information indicating that no allocated wireless resource is needed for the tranfer of the data from the mobile terminal to the base station being transferred by setting the power of pilot symbols to a null value;

means for transferring, to the mobile terminal, allocation information indicating that the wireless resource is allocated to the mobile terminal when the information indicates that the allocated wireless resource is needed, and means for receiving, from the mobile terminal, the data in the wireless resource indicated as allocated to the mobile terminal.

The present invention concerns a mobile terminal that transfers data to a base station after a wireless resource enabling the transfer of the data from the mobile terminal to the base station has been allocated, the mobile terminal comprising:

an interface that transmits, to the base station, information indicating whether or not an allocated, wireless resource is needed for the transfer of the data from the mobile terminal to the base station, the information indicating that no allocated wireless resource is needed for the transfer of the data from the mobile terminal to the base station being transferred by setting the power of pilot symbols to a null value, wherein the interface receives, from the base station. Allocation information indicating that the wireless resource is allocated to the mobile terminal when the information indicates that the allocated wireless resource is needed; and a processing unit that transfers the data to the base station in the wireless resource indicated as allocated to the mobile terminal.

The present invention concerns a base station that receives data from a mobile terminal after a wireless resource enabling the reception of the data from the mobile terminal has been allocated, the base station comprising:

an interface that receives, from the mobile terminal, information indicating whether or not an allocated wireless resource is needed for the reception of the data from the mobile terminal, the information indicating that no allocated wireless resource is needed for the transfer of the data from the mobile terminal to the base station being transferred by setting the power of pilot symbols to a null value; and a processing unit that transfers, to the mobile terminal, allocation information indicating that the wireless resource is allocated to the mobile terminal when the information indicates that the allocated wireless resource is needed, wherein the interface receives the data from the mobile terminal in the wireless resource indicated as allocated to the mobile terminal.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION

Figure 1:
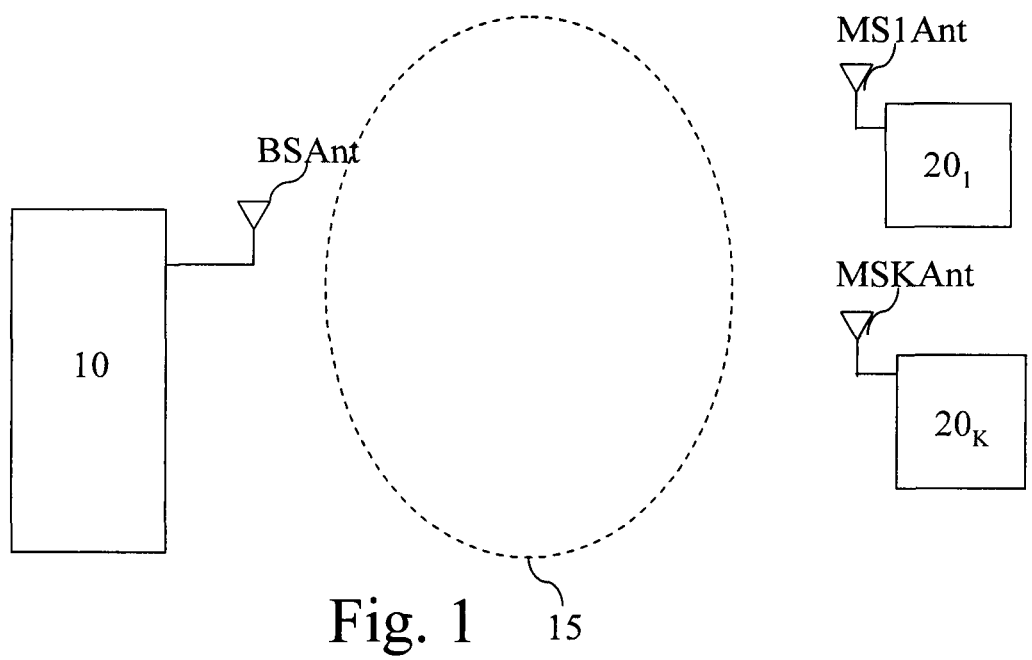
FIG. 1 is a diagram representing the architecture of the wireless network according to the present invention.

FIG. 1 is a diagram representing the architecture of the wireless network according to present invention.

In the telecommunication system of the FIG. 1, at least one and preferably plural second telecommunication devices $20_1$ or $20_K$ are linked through a network 15 to a first telecommunication device 10 through an uplink and a downlink channel.

The network is as example and in a non limitative a wireless network 15 but the present invention is also applicable to wired networks like power line networks.

Preferably, and in a non limitative way, the first telecommunication device 10 is a base station or a node or an enhanced node of the wireless network 15 or terminals like mobile phones, personal digital assistants, or personal computers.

Preferably, and in a non limitative way, the second telecommunication devices $20_1$ to $20_K$ are terminals like mobile phones, personal digital assistants, or personal computers.

As example, the telecommunication network 15 is a wireless telecommunication system which uses Time Division Duplexing scheme (TDD) or Frequency Division Duplexing scheme (FDD).

In TDD scheme, the signals transferred in uplink and downlink channels are duplexed in different time frames in the same frequency band. The signals transferred within the wireless network 15 share the same frequency spectrum.

In FDD scheme, the signals transferred in uplink and downlink channels are duplexed in different frequency bands.

When the first telecommunication device 10 transfers data, signals or messages to a second telecommunication device 20, the data, signals or messages are transferred through the downlink channel.

When a second telecommunication device 20 transfers signals or data to the first telecommunication device 10, the signals or data are transferred through an uplink time slot of the uplink channel. Preferably, the data are transferred under the form of at least one packet.

The first telecommunication device 10 receives from the second telecommunication devices 20 messages requesting a pilot symbol pattern to be used in the uplink channel. The first telecommunication device 10 allocates to each second telecommunication device 20, for a pilot allocation time duration, a pilot symbol pattern. Each allocated pilot symbol pattern is orthogonal from the other allocated pilot symbol patterns. During the pilot allocation time duration, each second telecommunication device 20 transfers the pilot symbol pattern it has been allocated through the uplink channel.

The first telecommunication device 10 determines the channel conditions which exist between itself and each second telecommunication device 20 using the signals received which are representative of the pilot symbol patterns. The first telecommunication device 10 allocates next uplink time frame to one of the second telecommunication device 20 for which channel conditions is considered as good i.e. the received power of the signal is upper than a predetermined value.

According to the invention, at least one second telecommunication device 20 sets the transmission power of the signals representative of a pilot symbol pattern according to the data it has to transfer.

The first telecommunication device 10 comprises at least one antenna noted BSAnt and each second telecommunication device comprises $20_1$ to $20_K$ at least one antenna noted respectively MS1Ant to MSKAnt.

Figure 2:
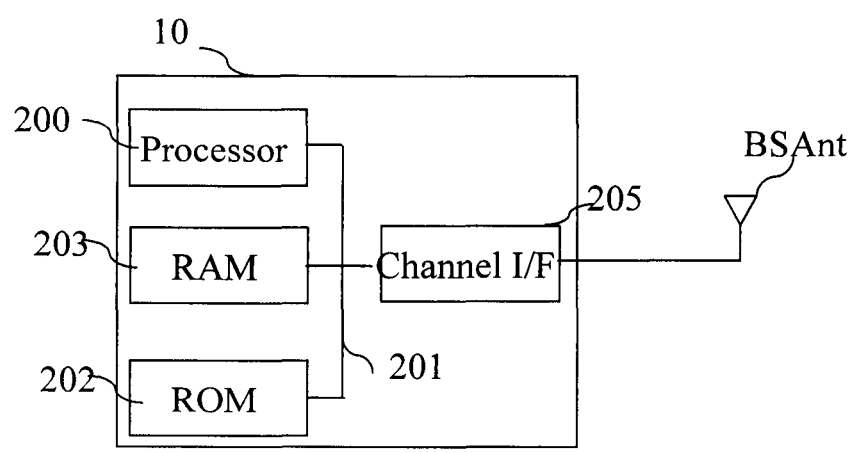
FIG. 2 is a diagram representing the architecture of a first telecommunication device according to the present invention.

FIG. 2 is a diagram representing the architecture of a first telecommunication device according to the present invention.

Figure 6:
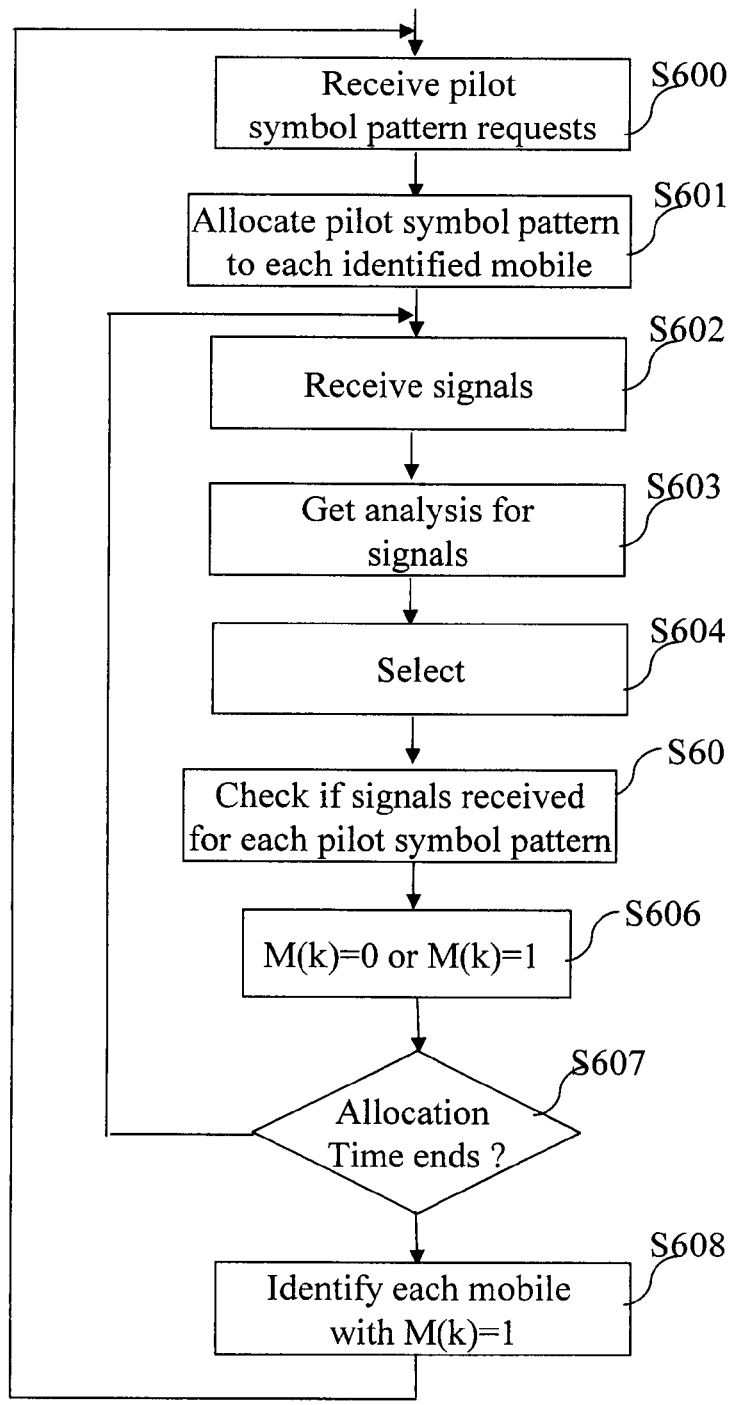
FIG. 6 is an algorithm executed by the first telecommunication device according to the present invention.

The first telecommunication device 10 has, for example, an architecture based on components connected together by a bus 201 and a processor 200 controlled by the program related to the algorithm as disclosed in the FIG. 6.

It has to be noted here that the first telecommunication device 10 is, in a variant, implemented under the form of one or several dedicated integrated circuits which execute the same operations as the one executed by the processor 200 as disclosed hereinafter.

The bus 201 links the processor 200 to a read only memory ROM 202, a random access memory RAM 203 and a channel interface 205.

The read only memory ROM 202 contains instructions of the programs related to the algorithm as disclosed in the FIG. 6 which are transferred, when the first telecommunication device 10 is powered on to the random access memory RAM 203.

The RAM memory 203 contains registers intended to receive variables, and the instructions of the programs related to the algorithm as disclosed in the FIG. 6.

The channel interface 205 enables the transfer of information representative of pilot symbol patterns which are allocated to each second telecommunication device 20. An information representative of a pilot symbol pattern is the pilot symbol pattern or an information, like an indicia, identifying the pilot symbol pattern.

Through the channel interface 205, the processor 200 indicates in a downlink time frame, which second telecommunication device 20 has to transfer a packet in the next uplink time frame.

The channel interface 205 comprises means for analysing the signals representative of pilot symbol patterns transferred by each second telecommunication device 20 in order to determine the channel conditions of each second telecommunication device 20, i.e., the channel conditions between the first telecommunication device 10 and each second telecommunication device 20.

Figure 3:
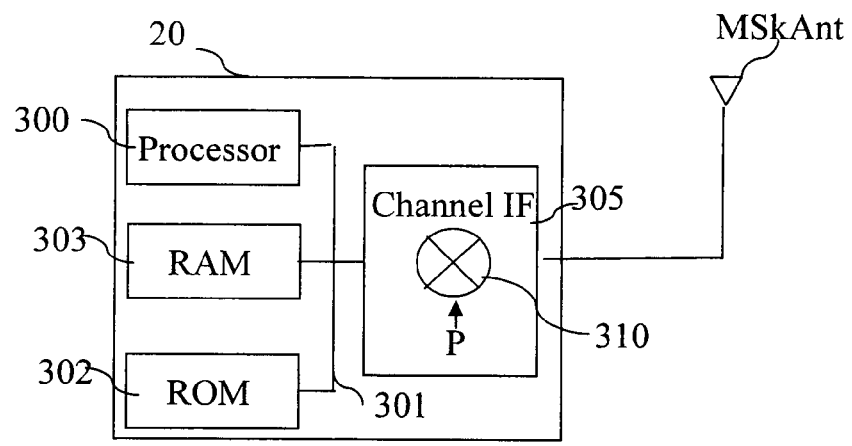
FIG. 3 is a diagram representing the architecture of a second telecommunication device according to the present invention.

FIG. 3 is a diagram representing the architecture of a second telecommunication device according to the present invention.

Figure 5:
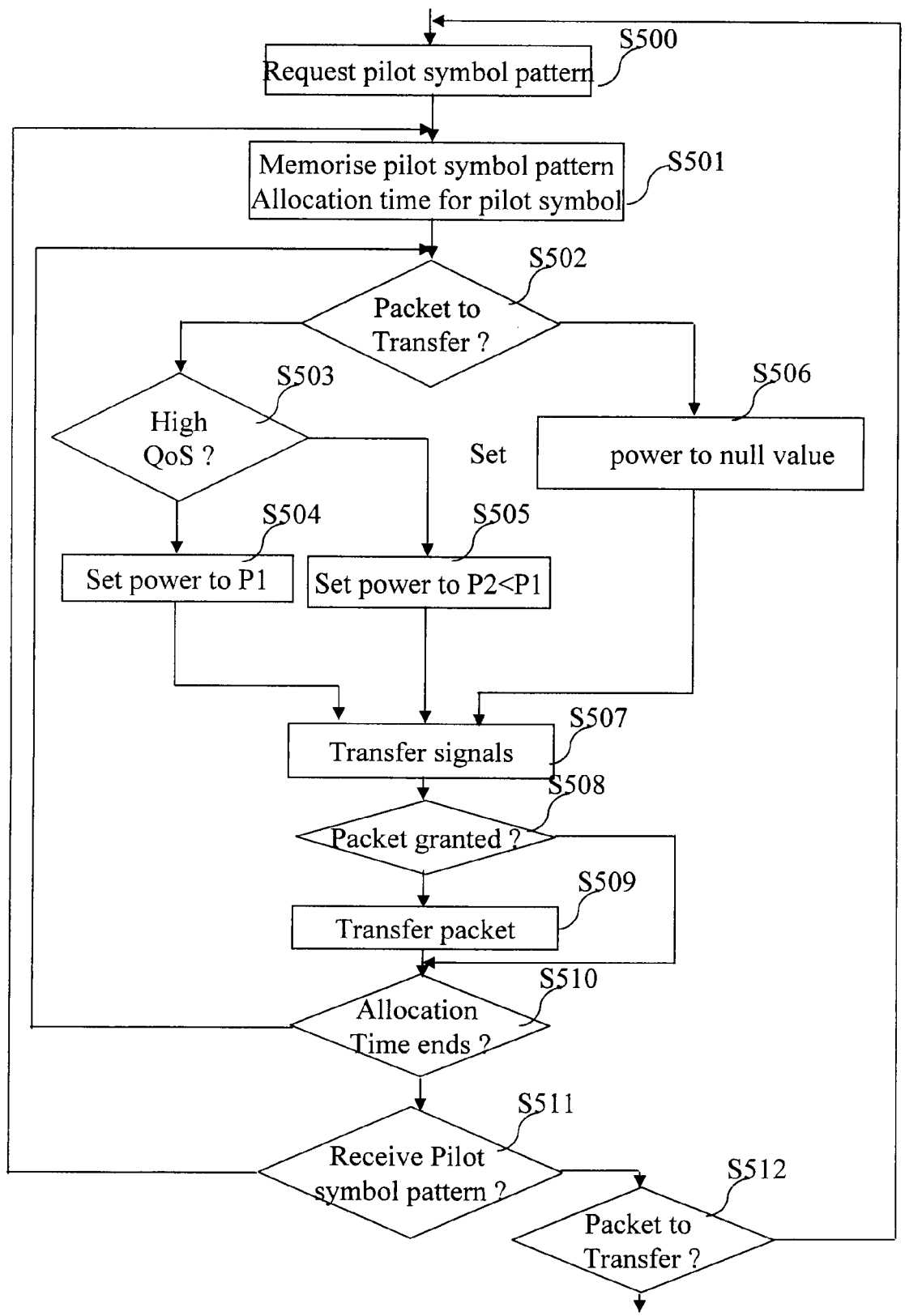
FIG. 5 is an algorithm executed by each second telecommunication device according to the present invention.

The second telecommunication device 20, as example the second telecommunication device $20_k$ with k comprised between 1 and K, has, for example, an architecture based on components connected together by a bus 301 and a processor 300 controlled by programs related to the algorithm as disclosed in the FIG. 5.

It has to be noted here that the second telecommunication device $20_k$ is, in a variant, implemented under the form of one or several dedicated integrated circuits which execute the same operations as the one executed by the processor 300 as disclosed hereinafter.

The bus 301 links the processor 300 to a read only memory ROM 302, a random access memory RAM 303 and a channel interface 305.

The read only memory ROM 302 contains instructions of the program related to the algorithm as disclosed in the FIG. 5 which are transferred, when the first telecommunication device $20_k$ is powered on to the random access memory RAM 303.

The RAM memory 303 contains registers intended to receive variables, and the instructions of the program related to the algorithm as disclosed in the FIG. 5.

The RAM memory 303 memorizes into a transmission queue, the data which are under the form of packets to be transferred by the second telecommunication device 20 to the first telecommunication device 10.

The channel interface 305 comprises means for transferring packets and signals representative of a pilot symbol pattern to the first telecommunication device 10. The channel interface 305 comprises means for controlling the power 310 of the signals representative of a pilot symbol pattern. As example and in a non limitative way, the means for controlling the power 310 of the signals representative of a pilot symbol pattern multiply the signals representative of a pilot symbol by a coefficient noted P determined by the processor 300.

The channel interface 305 comprises means for receiving in the downlink time frames, the pilot symbol pattern which is allocated to the second telecommunication device 20 and indication authorizing the second telecommunication device 20 to transfer packet in the next uplink time frame.

Figure 4:
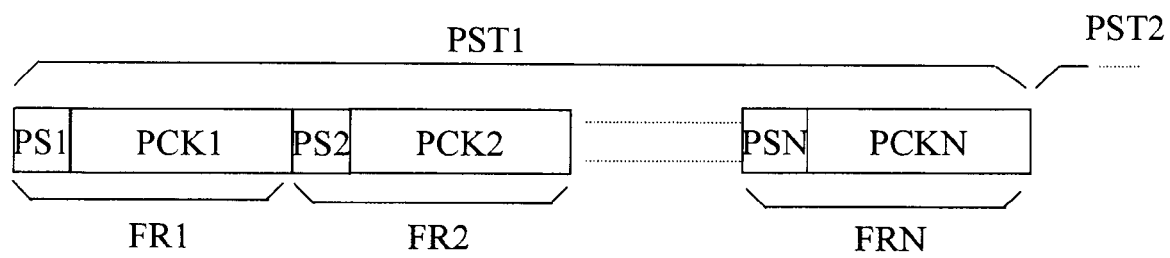
FIG. 4 is an example of representing of signals transferred in a uplink channel

FIG. 4 is an example of representing of signals transferred in the uplink channel.

The FIG. 4 shows two pilot allocation time durations noted PST1 and PST2. Each pilot allocation time duration PST1 or PST2 is around 20 milliseconds.

Each pilot allocation time duration PST1 or PST2 is decomposed into N time frames noted FR1, FR2 to FRN.

Each time frame FR1, FR2 to FRN is decomposed into a time slot noted respectively PS1, PS2 to PSN and a time slot noted respectively PCK1, PCK2 to PCKN.

During the pilot allocation time duration PST1, each second telecommunication device 20 transfers in the time slots noted PS1, PS2 to PSN signals representatives of the pilot symbol pattern the first telecommunication device 10 has allocated to the second telecommunication device 20. The transmission power of the signals representatives of the pilot symbol pattern is adjusted according to information associated to data to be transferred.

It has to be noted here that, if the transmission power of the signals representatives of the pilot symbol pattern is set to null value for a time slot PSn with $1 \leq n \leq N$, the transmission of the signals representatives of the pilot symbol pattern can be also understood as a non transmission of the signals in the time slot PSn.

During the pilot allocation time duration PST2, each second telecommunication device 20 transfers in the time slots noted PS1, PS2 to PSN, signals representatives of the pilot symbol pattern the first telecommunication device has allocated to the second telecommunication device 20. The transmission power of the signals representatives of the pilot symbol pattern is adjusted according to information associated to data to be transferred.

The pilot symbol pattern allocated to a second telecommunication device 20 in the pilot allocation time duration PST1 is equal to or different from the pilot symbol pattern allocated to the second telecommunication device 20 in the pilot allocation time duration PST2.

In each time slot PCK1, PCK2 to PCK3, a second telecommunication device 20 transfers packet to the first telecommunication device if the first telecommunication device 10 has allocated that time slot to the second telecommunication device 20.

FIG. 5 is an algorithm executed by each second telecommunication device according to the present invention.

The second telecommunication device 20, more precisely the processor 300, executes the present algorithm.

At step S500, the processor 300 commands the transfer through the uplink channel of a message requesting to the first telecommunication device 10 the allocation of a pilot symbol pattern to be used by the second telecommunication device 20 in the uplink channel.

At next step S501, the processor 300 memorizes in the RAM memory 303, the pilot symbol pattern allocated by the first telecommunication device 10 using information representative of the pilot symbol pattern received through the downlink channel.

At the same time, the processor 300 determines the pilot allocation time duration PST1. The pilot allocation time duration PST1 is determined by reading a predetermined field in the message comprising the allocated pilot symbol pattern or is determined by reading a predetermined value memorized in the ROM memory 302.

At next step S502, the processor 300 checks if there is a packet in the transmission queue to be transferred to the first telecommunication device 10.

If there is a packet in the transmission queue, the processor 300 moves to step S503, otherwise the processor 300 moves to step S506.

At step S503, the processor 300 checks if the quality of service which is associated to the first packet comprised in the transmission queue is high. As example and in a non limitative way, a packet to which a high quality of service is associated is a packet which needs to be transferred within a time limit like a packet comprising a data related to a telephone call or a video content. A packet to which a low quality of service is associated is, as example, a packet which comprises a text content for which the transmission delay is not essential.

If the quality of service which is associated to the first packet comprised in the transmission queue is high, the processor 300 moves to step S504.

If the quality of service which is associated to the first packet comprised in the transmission queue is low, the processor 300 moves to step S505.

At step S504, the processor 300 sets the value of the coefficient P to P1 and transfers it to the channel interface 305 which controls the power of the signals representative of a pilot symbol pattern by multiplying the signals representative of a pilot symbol pattern by the value P1 of the coefficient P. After that, the processor 300 moves to step S507.

At step S505, the processor 300 sets the value of the coefficient P to P2, with P2<P1 and transfers it to the channel interface 305 which controls the power of the signals representative of a pilot symbol pattern by multiplying the signals representative of a pilot symbol pattern by the value P2 of the coefficient P. After that, the processor 300 moves to step S507.

At step S507, the processor 300 transfers the pilot symbol pattern stored in the RAM memory 303 to the channel interface 305.

Signals representative of the pilot symbol pattern are multiplied by the coefficient P and transferred through the uplink channel to the first telecommunication device 10.

At next step S508, the processor 300 checks if a message is received from the first telecommunication device 10 through the downlink channel authorizing the second telecommunication device 20 to transfer a packet through in the next time frame of the uplink channel.

If a message authorizing the second telecommunication device 20 to transfer a packet through in the next time frame of the uplink channel is received, the processor 300 moves to step S509.

If no message authorizing the second telecommunication device 20 to transfer a packet through in the next time frame of the uplink channel is received, the processor 300 moves to step S510.

At step S509, the processor 300 commands the transfer of the first packet of the transmission queue to the channel interface 305. That packet is discarded from the transmission queue. It has to be noted here that, in a preferred mode of realisation, the packet is discarded from the transmission queue only if the processor 300 detects the reception, in response to the transferred packet, of an acknowledgment message transferred by the first telecommunication device 10.

At step S510, the processor 300 checks if the pilot allocation time duration PST ends.

If the pilot allocation time duration PST is not ended, the processor 300 returns to step S502.

If the pilot allocation time duration PST is ended, the processor 300 moves to step S511.

At step S502, the processor 300 checks if there is a packet in the transmission queue to be transferred to the first telecommunication device 10.

If there is no packet in the transmission queue, the processor 300 moves to step S506, otherwise the processor 300 moves to step S503.

At step S506, the processor 300 sets the value of the coefficient P to null value, and transfers it to the channel interface 305 which controls the power of the signals representative of a pilot symbol pattern by multiplying the signals representative of the pilot symbol pattern by the null value. After that, the processor 300 moves to step S507.

The processor 300 executes the steps S502 to S510 as far as the pilot allocation time duration PST ends.

At step S511, the processor 300 checks whether or not, information representative of a pilot symbol pattern is received from the first telecommunication device 10 through the downlink channel for the next pilot allocation time duration.

If a pilot symbol pattern is received from the first telecommunication device 10, the processor 300 returns to step S501.

If no pilot symbol pattern is received from the first telecommunication device 10, the processor 300 moves to step S512 and checks if there is a packet in the transmission queue to be transferred to the first telecommunication device 10.

If there is a packet in the transmission queue, the processor 300 returns to step S500, otherwise the processor 300 stops the present algorithm. When a packet will be in the transmission queue, the processor 300 will execute again the present algorithm.

It has to be noted here that, in a variant of realisation, the step S511 is not executed by the processor 300. In such variant, the processor 300 moves from step S510 to S512.

FIG. 6 is an algorithm executed by the first telecommunication device according to the present invention.

More precisely, the present algorithm is executed by the processor 200 of the first telecommunication device 10.

At step S600, the processor 200 detects the reception through the uplink channel of messages requesting the first telecommunication device 10 the allocation of a pilot symbol pattern. The processor 200 identifies each of the second telecommunication devices which sent a message requesting the first telecommunication device 10 the allocation of a pilot symbol pattern.

Such messages are transferred by the second telecommunication devices 20 which need to transfer packets through the uplink channel.

At next step S601, the processor 200 allocates a pilot symbol pattern to each of the identified second telecommunication devices 20. A pilot symbol pattern is a sequence of bits, each pilot symbol pattern is orthogonal from the other pilot symbol patterns. Information representative of each allocated pilot symbol pattern is transferred respectively to each identified second telecommunication device 20.

At the same step, the processor 200 activates the pilot allocation time duration. The pilot allocation time duration PST is transferred with the pilot symbol patterns or not. The pilot allocation time duration PST is equal to a predetermined value memorized in the ROM memory 202.

At next step S602, the processor 200 detects, through the channel interface 205, the reception of signals representative of the pilot symbol patterns transferred by the identified second telecommunication devices 20.

At next step S603, the processor 200 gets, from the channel interface 205, the channel conditions which exist between itself and each second telecommunication device 20 using the signals received which are representative of the pilot symbol patterns. As example, the channel interface 205 measures, for each pilot symbol pattern, the power of the corresponding received signals.

At next step S604, the processor 200 selects, using the channel conditions, the second telecommunication device 20 to which next uplink time frame is allocated.

As example, the processor 200 selects the second telecommunication device 20 which transferred the signals which have the highest measured power.

It has to be noted here that, if each second telecommunication device 20 sets the transmission power of the signals representative of a pilot symbol pattern according to the packet it has to transfer, the probability that the first telecommunication device 10 allocates the next time frame to a second telecommunication device 20 which has a packet which has an associated high quality of service is increased.

Furthermore, as each second telecommunication device 20 sets the transmission power of the signals representative of a pilot symbol pattern to null value when no packets need to be transferred, the first telecommunication device 10 never allocates the next time frame to a second telecommunication device 20 which has no packet to transfer, optimizing then the resources of the wireless network 15.

At next step S605, the processor 200 checks, for each allocated pilot symbol pattern, if signals representative of said pilot symbol pattern have not been received.

Such case occurs when at least one second telecommunication device 20 sets the transmission power of the signals representative of a pilot symbol pattern to null value.

At next step S606, the processor 200 sets K variables M(k), with k=1 to K to the value one or null according to the results of the step S605.

If signals representative of the pilot symbol pattern allocated to the second telecommunication device $20_k$ have been received, the processor 200 sets the variable M(k) to the value one.

If signals representative of the pilot symbol pattern allocated to the second telecommunication device $20_k$ have not been received, the processor 200 sets the variable M(k) to the null value. Thanks to that, the processor 200 is able to determine the second telecommunication devices which have no more packets to transfer at the end of the pilot allocation time duration PST.

At next step S607, the processor 200 checks if the pilot allocation time duration PST ends.

If the pilot allocation time duration PST is not ended, the processor 200 returns to step S602.

If the pilot allocation time duration PST is ended, the processor 200 moves to step S608.

At step S608, the processor 200 identifies each second telecommunication device 20 of which the variable M(k) is equal to the value one.

It has to be noted here that in a variant, the processor 200 counts the number of time $x_1$ to $x_K$ signals representative of the pilot symbol pattern allocated respectively to the second telecommunication devices $20_1$ to $20_K$ have been received within the pilot allocation time duration PST. The processor 200 forms a list of pilot symbol patterns which have $x_k$ upper than a predetermined threshold and identifies the corresponding second telecommunication devices 20.

The processor 200 returns then to step S600 of the present algorithm.

Naturally, many modifications can be made to the embodiments of the invention described above without departing from the scope of the present invention.

The invention claimed is:

1. A method of transferring data from a mobile terminal to a base station after a wireless resource enabling the transfer of the data from the mobile terminal to the base station has been allocated, the mobile terminal performing the method comprising:
   transferring information indicating whether or not an allocated wireless resource is needed for the transfer of the data from the mobile terminal to the base station, the information indicating that no allocated wireless resource is needed for the transfer of the data from the mobile terminal to the base station being transferred by setting the power of pilot symbols to a null value;
   receiving, from the base station, allocation information indicating that the wireless resource is allocated to the mobile terminal when the information indicates that the allocated wireless resource is needed; and
   transferring the data to the base station in the wireless resource indicated as allocated to the mobile terminal.

2. The method according to claim 1, wherein the information indicating whether or not the allocated wireless resource is needed for the transfer of the data from the mobile terminal to the base station is transferred periodically.

3. The method according to claim 2, wherein a pilot symbol allocated to the mobile terminal is orthogonal to another pilot symbol allocated to another mobile terminal.

4. The method according to claim 3, wherein the data is transferred as packets.

5. A method of transferring data from a mobile terminal to a base station after a wireless resource enabling the transfer of the data from the mobile terminal to the base station has been allocated, the base station performing the method comprising:
   receiving, from the mobile terminal, information indicating whether or not an allocated wireless resource is needed for the transfer of the data from the mobile terminal to the base station, the information indicating that no allocated wireless resource is needed for the transfer of the data from the mobile terminal to the base station being transferred by setting the power of pilot symbols to a null value;

transferring, to the mobile terminal, allocation information indicating that the wireless resource is allocated to the mobile terminal when the information indicates that the allocated wireless resource is needed; and receiving, from the mobile terminal, the data in the wireless resource indicated as allocated to the mobile terminal.

6. The method according to claim 5, wherein the information indicating whether or not the allocated wireless resource is needed for the transfer of the data from the mobile terminal to the base station is received periodically.

7. The method according to claim 6, wherein the base station allocates orthogonal pilot symbols to at least two mobile terminals.

8. The method according to claim 7, wherein the data is received as packets.

9. A device for transferring data from a mobile terminal to a base station after a wireless resource enabling the transfer of the data from the mobile terminal to the base station has been allocated, wherein the device for transferring of the data is included in the mobile terminal and comprises:
  a means for transferring, to the base station, information indicating whether or not an allocated wireless resource is needed for the transfer of data from the mobile terminal to the base station, the information indicating that no allocated wireless resource is needed for the transfer of the data from the mobile terminal to the base station being tranferred by setting the power of pilot symbols to a null value;
  a means for receiving, from the base station, allocation information indicating that the wireless resource is allocated to the mobile terminal when the information indicates that the allocated wireless resource is needed; and
  a means for transferring the data to the base station in the wireless resource indicated as allocated to the mobile terminal.

10. A device for transferring of data from a mobile terminal to a base station after a wireless resource enabling the transfer of the data from the mobile terminal to the base station has been allocated, wherein the device for transferring of the data is included in the base station and comprises:
  a means for receiving, from the mobile terminal, information indicating whether or not an allocated wireless resource is needed for the transfer of the data from the mobile terminal to the base station, the information indicating that no allocated wireless resource is needed for the transfer of the data from the mobile terminal to the base station being transferred by setting the power of pilot symbols to a null value;
  a means for transferring, to the mobile terminal, allocation information indicating that the wireless resource is allocated to the mobile terminal when the information indicates that the allocated wireless resource is needed; and
  a means for receiving the data from the mobile terminal in the wireless resource indicated as allocated to the mobile terminal.

11. A mobile terminal that transfers data to a base station after a wireless resource enabling the transfer of the data from the mobile terminal to the base station has been allocated, the mobile terminal comprising:
  an interface that transmits, to the base station, information indicating whether or not an allocated wireless resource is needed for the transfer of the data from the mobile terminal to the base station, the information indicating that no allocated wireless resource is needed for the transfer of the data from the mobile terminal to the base station being transferred by setting the power of pilot symbols to a null value, wherein the interface receives, from the base station, allocation information indicating that the wireless resource is allocated to the mobile terminal when the information indicates that the allocated wireless resource is needed; and
  a processing unit that transfers the data to the base station in the wireless resource indicated as allocated to the mobile terminal.

12. A base station that receives data from a mobile terminal after a wireless resource enabling the reception of the data from the mobile terminal has been allocated, the base station comprising:
  an interface that receives, from the mobile terminal, information indicating whether or not an allocated wireless resource is needed for the reception of the data from the mobile terminal, the information indicating that no allocated wireless resource is needed for the transfer of the data from the mobile terminal to the base station being transferred by setting the power of pilot symbols to a null value; and
  a processing unit that transfers, to the mobile terminal, allocation information indicating that the wireless resource is allocated to the mobile terminal when the information indicates that the allocated wireless resource is needed, wherein
  the interface receives the data from the mobile terminal in the wireless resource indicated as allocated to the mobile terminal.

\* \* \* \* \*